Figure 1:
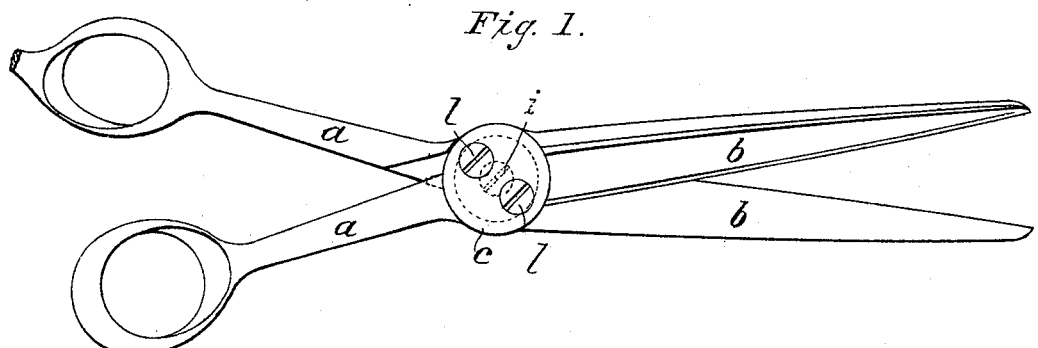
Figure 2:
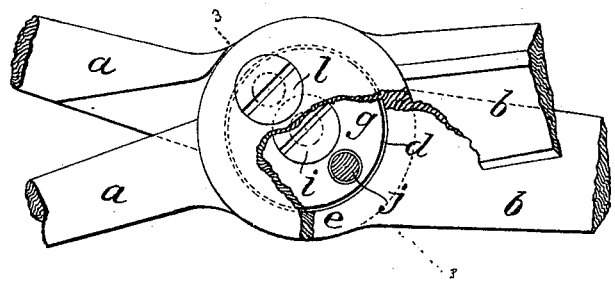
Figure 3:
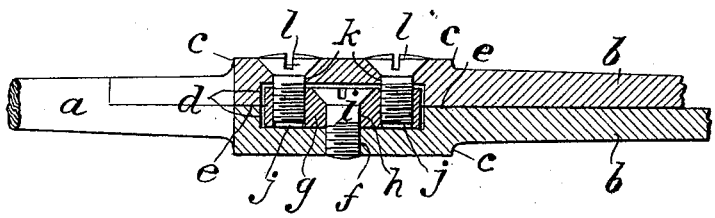

No. 642,345. Patented Jan. 30, 1900.
F. LOFFI.
TOOL JOINT.
(Application filed Oct. 9, 1899.)

(No Model.)

WITNESSES:
Wm A. Skinkle
C. I. Henderson.

INVENTOR.
Fransis Loffi.
BY
A. M. Austin
ATTORNEY.

UNITED STATES PATENT OFFICE.

FRANSIS LOFFI, OF CLEVELAND, OHIO.

TOOL-JOINT.

SPECIFICATION forming part of Letters Patent No. 642,345, dated January 30, 1900.

Application filed October 9, 1899. Serial No. 732,999. (No model.)

*To all whom it may concern:*

Be it known that I, FRANSIS LOFFI, a citizen of the United States of America, residing at Cleveland, Cuyahoga county, Ohio, have invented a new and useful Improvement in Tool-Joints, of which the following is a specification.

In the accompanying drawings, Figure I is a plan view of a cutting-tool provided with my improved joint. Fig. II is a plan view, on an enlarged scale, representing the tool broken away to more clearly disclose the construction. Fig. III is a side elevation in section, taken on line 3 3 of Fig. II.

My improved joint is shown in the drawings as applied to a cutting-tool consisting of two parts, each having a handle $a$ and a blade $b$. Each part is provided at its pivotal point with corresponding heads or enlargements $c$, preferably circular and having mating recesses $d$ formed in their bearing-faces $e$. One of the parts—the lower as seen in the drawings—is provided centrally in its recess with a tapped perforation $f$. A washer $g$, provided with a central chamfered perforation $h$, is secured in said recess by means of a countersunk pivot-screw $i$. The washer is freely rotatable upon the pivot-screw and is slightly less in thickness than the width of the cavity formed by the mating recesses. The washer is also provided with two screw-threaded perforations or screw-seats $j$, arranged diametrically opposite each other. The other part of the tool—the upper part as seen in the drawings—is provided with two chamfered perforations $k$, arranged diametrically opposite each other and preferably on a plane at an angle to the axis of the part. Screws $l$ are secured through said perforations and engage in the seats provided in the washer.

To assemble the parts, the rotatable washer is first secured in the recess of the part provided with the perforation tapped to receive the pivot-screw. The other part of the tool is then placed so that the walls of the recesses forming the bearing between the parts will register and the recesses mate with each other. Said part is secured to the washer by means of its screws, the washer being first rotated so that the screw-seats therein will register with the tapped perforations through the said part. The screws are tightened until the countersink in the washer formed by the chamfer around its central perforation engages the countersunk head of the pivot-bolt, so that the washer will be held out of frictional contact with either the top or bottom of the cavity formed by the recesses. By this construction the only bearings for the tool parts are the annular walls of the central recesses which provide bearing-faces. As the parts have no central bearing, the looseness common in articles which are pivoted together by means of a rivet or a similar device is completely avoided. The screws securing one tool part rigidly to the washer hold the washer out of frictional contact with the top and bottom of the cavity formed by the recesses and throw all of the shear upon the countersunk head of the pivot-screw. Equal wear of the bearing parts is obtained, and therefore perfect alinement of the two cutting edges can be maintained for a much longer period than is otherwise possible. Although I have shown my joint as applied to a cutting-tool, it is obvious that the same is adapted to be used with tools of every description pivoted to rotate upon each other.

I claim as my invention—

1. The combination with two tool parts provided with circular bearing-faces having central mating recesses formed therein, of a washer in said recesses pivoted to one of the parts and rigidly secured to the other of said parts for holding said bearing-faces in rotatable contact with each other, said washer being held out of frictional contact with either part, substantially as described.

2. The combination of two tool parts provided with bearing-faces rotatable upon each other, an annular recess in one of said bearing-faces, a washer in said recess pivoted to one of the parts and rigidly secured to the other part for holding said bearing-faces in contact with each other, substantially as described.

3. In a tool-joint, the combination with the tool parts having annular bearing-faces provided with central recesses, of a washer pivoted to rotate in the recess of one part, and means for rigidly securing the same in the recess of the other part and for holding said washer out of frictional contact with either part, substantially as described.

4. In a tool-joint, a recess in one of the tool parts having an annular wall providing a bearing, a washer having a chamfered central perforation pivoted to rotate upon a countersunk screw passing through said perforation and secured in the bottom of the recess, a mating recess formed in the other tool part having a corresponding bearing-wall inclosing the washer, and screws passing through perforations arranged diametrically opposite each other in the top of said recess, engaging in the washer to rigidly secure said tool part to the washer and hold said washer out of frictional contact with either tool part, substantially as described.

In testimony whereof I sign this application, in the presence of two witnesses, this 7th day of October, 1899.

FRANSIS LOFFI.

Witnesses:
  C. D. KIDDER,
  GRACE L. KIDDER.